United States Patent
Pudduck

(10) Patent No.: US 11,154,859 B2
(45) Date of Patent: Oct. 26, 2021

(54) SENSOR ASSEMBLY FOR A SAMPLE FLUID ANALYSIS SYSTEM

(71) Applicant: Siemens Healthcare Diagnostics Inc., Tarrytown, NY (US)

(72) Inventor: Christian Pudduck, Norfolk, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/973,962

(22) PCT Filed: Jun. 20, 2019

(86) PCT No.: PCT/US2019/038170
§ 371 (c)(1),
(2) Date: Dec. 10, 2020

(87) PCT Pub. No.: WO2020/005697
PCT Pub. Date: Jan. 2, 2020

(65) Prior Publication Data
US 2021/0121877 A1  Apr. 29, 2021

Related U.S. Application Data

(60) Provisional application No. 62/692,075, filed on Jun. 29, 2018.

(51) Int. Cl.
*B01L 3/00* (2006.01)
*G01N 33/50* (2006.01)

(52) U.S. Cl.
CPC . *B01L 3/502715* (2013.01); *B01L 2300/0663* (2013.01); *B01L 2300/0816* (2013.01)

(58) Field of Classification Search
CPC .. B01L 3/502715; B01L 3/5027; B01L 3/502; B01L 3/50; G01N 33/5375;
(Continued)

(56) References Cited

U.S. PATENT DOCUMENTS

| 6,082,185 A | 7/2000 | Saaski |
| 7,444,864 B2 | 11/2008 | Yajima et al. |

(Continued)

FOREIGN PATENT DOCUMENTS

| JP | 2006281550 A | 10/2006 |
| JP | 2009148735 A | 7/2009 |

(Continued)

OTHER PUBLICATIONS

International Search Report and Written Opinion of International Application No. PCT/US2019/038170 dated Sep. 20, 2019.
(Continued)

*Primary Examiner* — Christine T Mui
(74) *Attorney, Agent, or Firm* — Dunlap Codding P.C.

(57) ABSTRACT

A sensor assembly includes a first sensor substrate with upper surface, lower surface opposite upper surface, and a first set of sensors on the first sensor substrate. The sensor assembly includes a second sensor substrate with upper surface, lower surface in opposite upper surface, and a second set of sensors on the second sensor substrate. The sensor assembly includes a base with upper surface, lower surface opposite upper surface of the base along a vertical direction, a front end, a rear end opposite the front end along a longitudinal direction perpendicular to the vertical direction, a first recess at least partially holds the first sensor substrate, a second recess at least partially holds the second sensor substrate, a first fluid passage for receiving a fluid, and a second fluid passage in series with and open to the first fluid passage. Both sensors are exposed to its corresponding fluid passage.

20 Claims, 9 Drawing Sheets

(58) Field of Classification Search
CPC .... G01N 33/537; G01N 33/53; G01N 33/536; G01N 33/50
USPC .................. 422/412, 408, 401, 400, 82.01
See application file for complete search history.

(56) References Cited

U.S. PATENT DOCUMENTS

| | | |
|---|---|---|
| 9,212,938 B2 | 12/2015 | Etherington et al. |
| 2005/0031490 A1 | 2/2005 | Gumbrecht et al. |
| 2014/0224002 A1 | 8/2014 | Fukuura et al. |
| 2016/0245793 A1 | 8/2016 | Samsoondar |
| 2018/0104682 A1 | 4/2018 | Khattak et al. |

FOREIGN PATENT DOCUMENTS

| | | |
|---|---|---|
| JP | 2016052253 A | 4/2016 |
| WO | 2018031786 A1 | 2/2018 |

OTHER PUBLICATIONS

European Search Report and Search Opinion of European Application No. 19825808.9 dated Jul. 19, 2021.

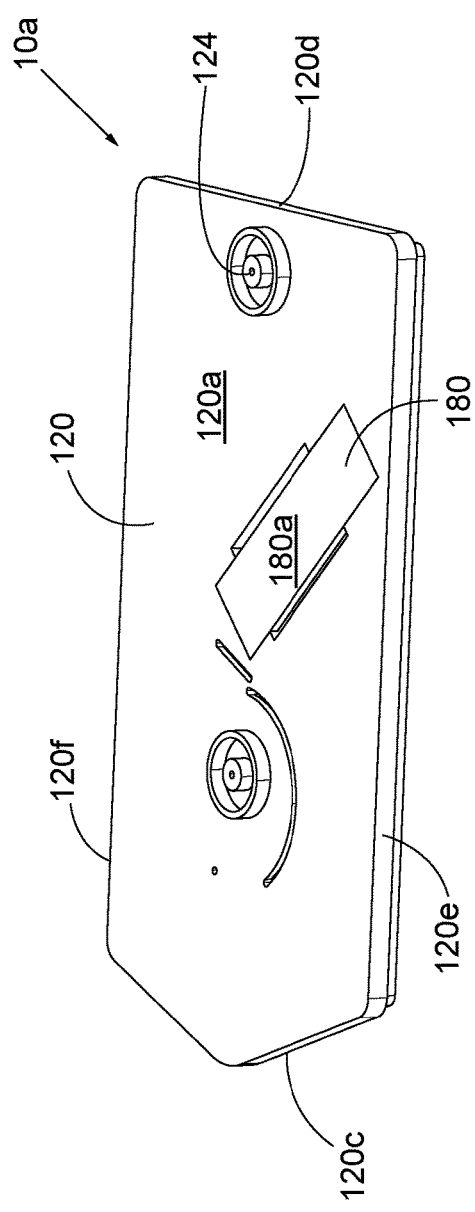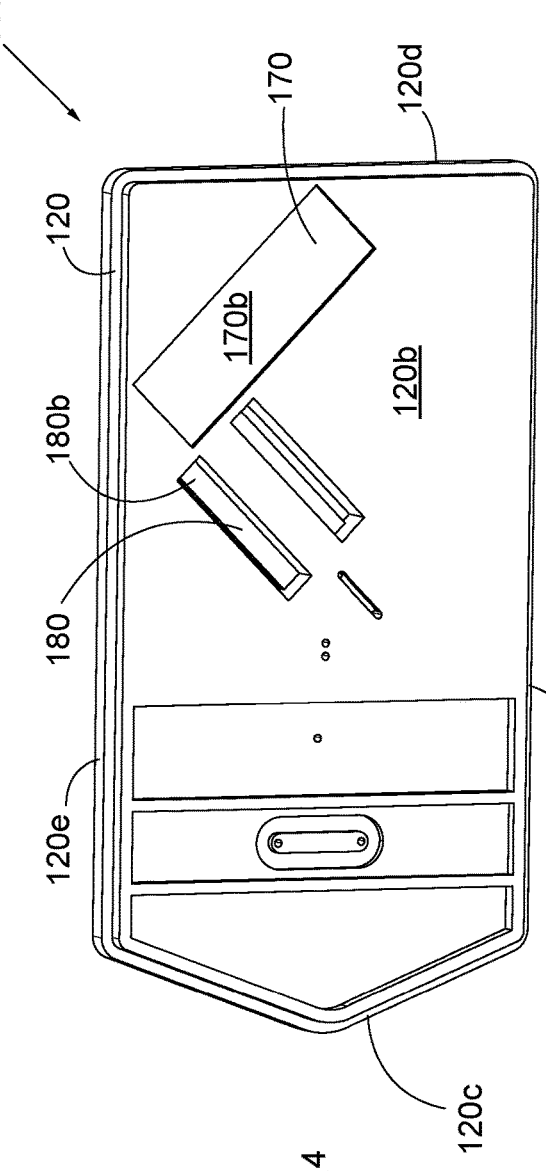
FIG. 4A
FIG. 4B

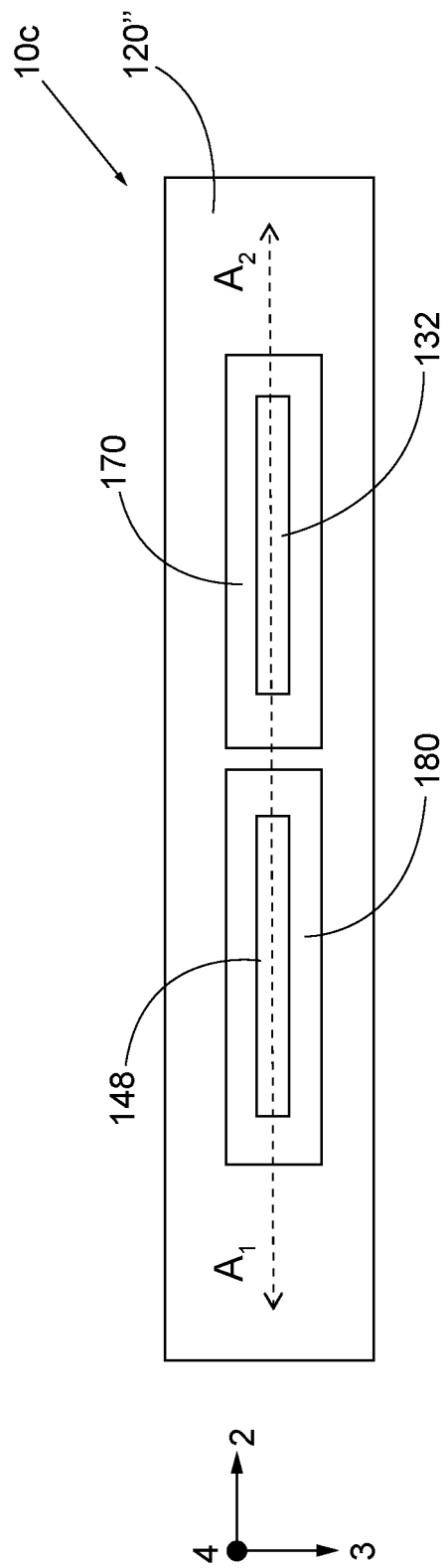
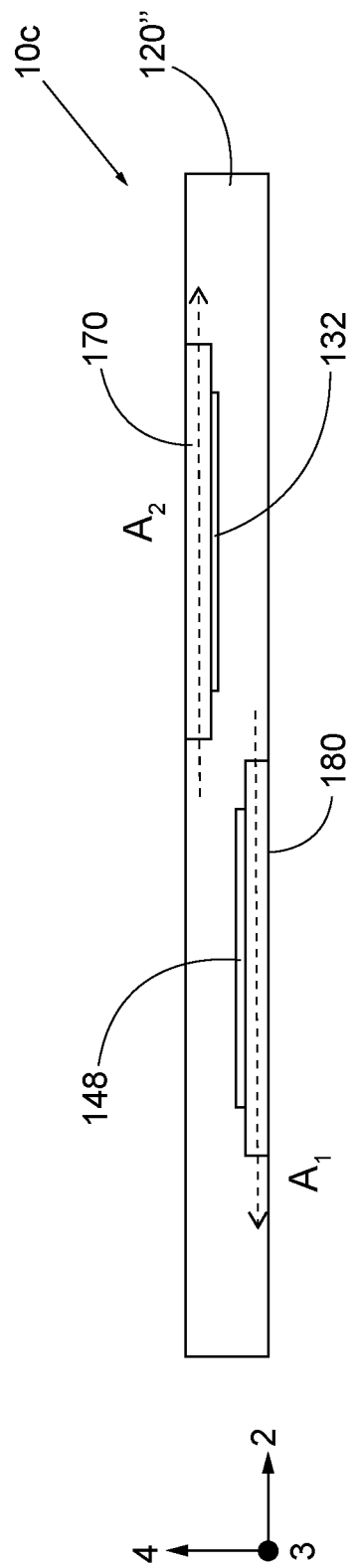
FIG. 8A
FIG. 8B

SENSOR ASSEMBLY FOR A SAMPLE FLUID ANALYSIS SYSTEM

The subject application claims benefit under 35 USC § 119(e) of US provisional Application No. 62/692,075, filed Jun. 29, 2018. The entire contents of the above-referenced patent application are hereby expressly incorporated herein by reference.

TECHNICAL FIELD

The present disclosure relates to a sensor assembly for a sample fluid analysis system, and in particular to an array of sensors for such a sensor assembly.

BACKGROUND

Diagnostic methods may include testing a sample to measure sample properties and/or to detect substances of interest that may be present in the sample. In the field of blood gas analysis, a set of sensors disposed on a sensor substrate can be used. However, in certain testing scenarios, particularly regarding the testing of samples obtained from neonates, a testing platform that requires low sample volume is desirable, as the quantity of sample fluid that can be obtained is limited or can be expensive to obtain. Additionally, a testing platform that does not require increased sample fluid volume with an increase of the number of analytes being detected is also desirable.

SUMMARY

An embodiment of the disclosure is a sensor assembly that includes a first sensor substrate having an upper surface, a lower surface opposite the upper surface, and a first set of sensors disposed along the lower surface of the first sensor substrate. The sensor assembly also includes a second sensor substrate having an upper surface, a lower surface opposite the upper surface, and a second set of sensors disposed along the lower surface of the second sensor substrate. The sensor assembly further includes a base having an upper surface, a lower surface opposite the upper surface of the base along a vertical direction, a front end, a rear end opposite the front end along a longitudinal direction that is perpendicular to the vertical direction, a first recess that extends from the upper surface of the base and at least partially holds the first sensor substrate, a second recess that extends from the upper surface of the base and at least partially holds the second sensor substrate, a first fluid passage for receiving a fluid, and a second fluid passage in series with and open to the first fluid passage. The first set of sensors are exposed to the first fluid passage, and the second set of sensors are exposed to the second fluid passage.

Another embodiment of the disclosure is a sensor assembly including a first sensor substrate having an upper surface, a lower surface opposite the upper surface, and a first set of sensors disposed on the lower surface of the first sensor substrate. The sensor assembly also includes a second sensor substrate defining an upper surface, a lower surface opposite the upper surface, and a second set of sensors disposed on the upper surface of the second sensor substrate. The sensor assembly further includes a base that defines an upper surface, a lower surface opposite the upper surface of the base along a vertical direction, a front end, a rear end opposite the front end along a longitudinal direction that is perpendicular to the vertical direction, a first recess that extends from the upper surface of the base and at least partially holds the first sensor substrate, a second recess that extends from the lower surface of the base and at least partially holds the second sensor substrate, a first fluid passage for receiving a fluid, and a second fluid passage in series with and open to the first fluid passage. The first set of sensors are exposed to the first fluid passage, and the second set of sensors are exposed to the second fluid passage.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings:

FIG. 4A is a top perspective view of a sensor assembly according to another embodiment of the present disclosure;

FIG. 4B is a bottom perspective view of the sensor assembly shown in FIG. 4A;

FIG. 8A is a top schematic view of a sensor assembly according to another embodiment of the present disclosure; and FIG. 8B is a side schematic sectional view of the sensor assembly shown in FIG. 8A.

DETAILED DESCRIPTION OF ILLUSTRATIVE EMBODIMENTS

Figure 1:
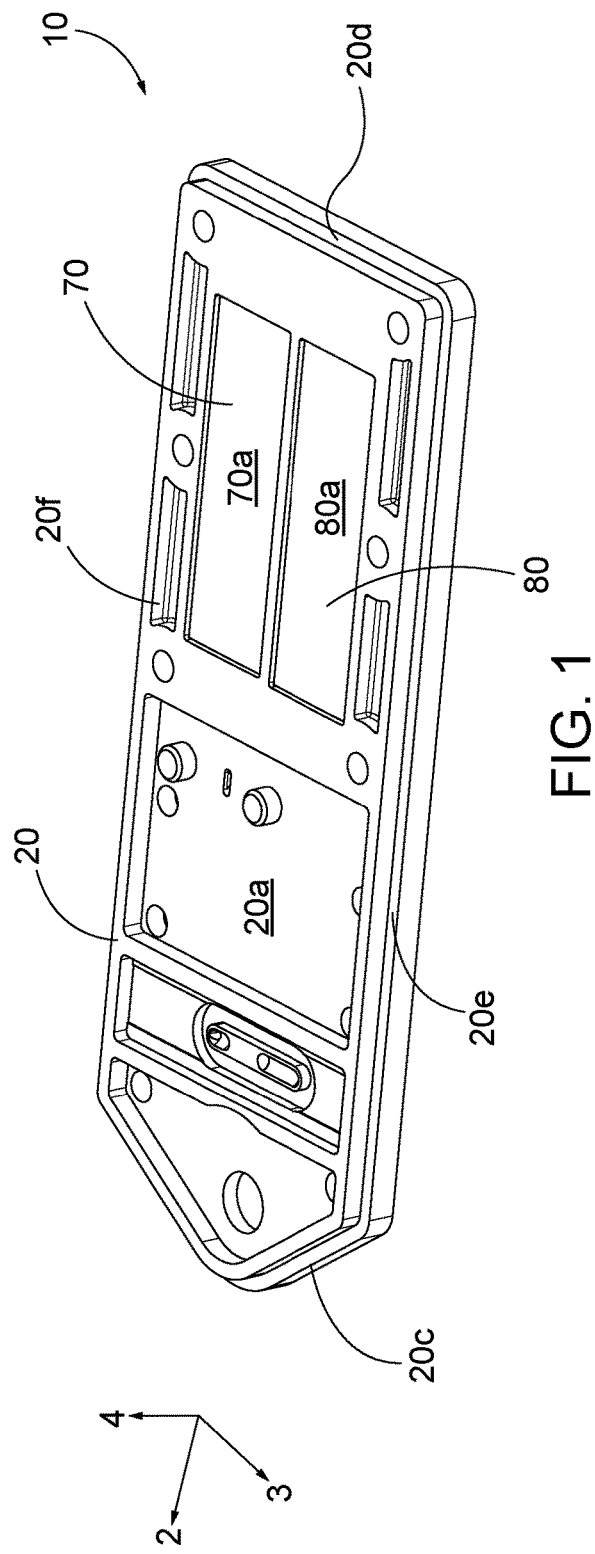
FIG. 1 is a perspective view of a sensor assembly according to an embodiment of the present disclosure.

Certain terminology is used to describe the sensor assemblies 10, 10a, 10b, 10c in the following description for convenience only and is not limiting. The words "right," "left," "lower," and "upper" designate directions in the drawings to which reference is made. The words "inner" and "outer" refer to directions toward and away from, respectively, the geometric center of the description to describe the sensor assemblies 10, 10a, 10b, 10c and related parts thereof. The words "forward" and "rearward" refer to directions in a longitudinal direction 2 and a direction opposite the longitudinal direction 2 along the sensor assemblies 10, 10a, 10b, 10c and related parts thereof. The terminology includes the above-listed words, derivatives thereof, and words of similar import.

Unless otherwise specified herein, the terms "longitudinal," "lateral," and "vertical" are used to describe the orthogonal directional components of various components of the sensor assemblies 10, 10a, 10b, 10c, as designated by the longitudinal direction 2, lateral direction 3, and vertical direction 4. It should be appreciated that while the longitudinal and lateral directions 2, 3 are illustrated as extending along a horizontal plane, and the vertical direction 4 is illustrated as extending along a vertical plane, the planes that encompass the various directions may differ during use.

FIGS. 1-3B depict a first embodiment of a sensor assembly 10 for receiving and testing a sample fluid in a sample fluid analysis system. FIG. 1 shows a perspective view of the sensor assembly 10 in a fully assembled configuration. The sensor assembly 10 includes a first sensor substrate 70, a second sensor substrate 80, and a base 20 configured to receive the first and second sensor substrates 70, 80. The base 20 may define a plurality of fluidic passageways for receiving the sample fluid, as will be discussed further below.

Figure 3A:
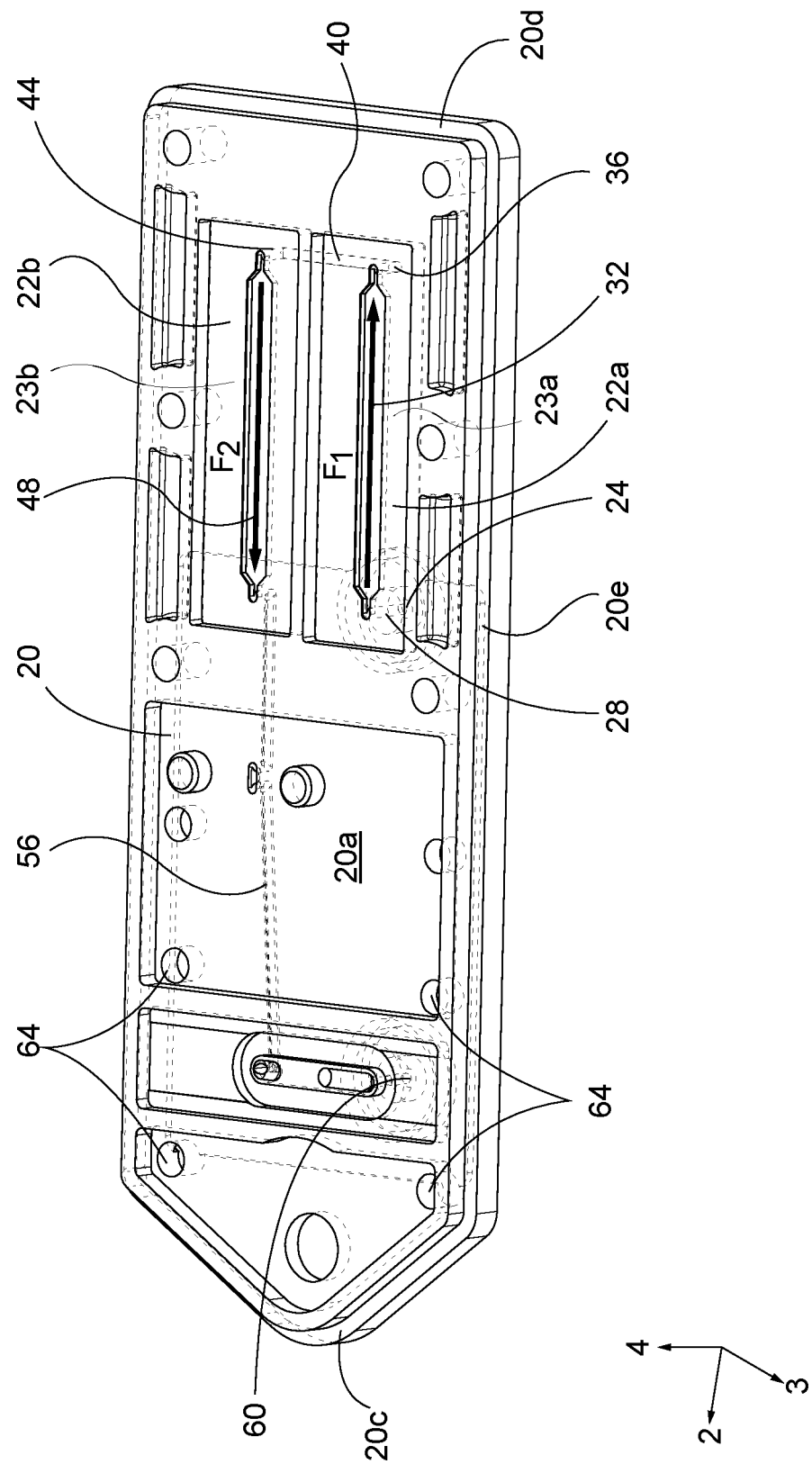
FIG. 3A is a top transparent perspective view of a base of the sensor assembly shown in FIG. 1, illustrating fluid passageways connecting the first and second sensor substrates.
Figure 3B:
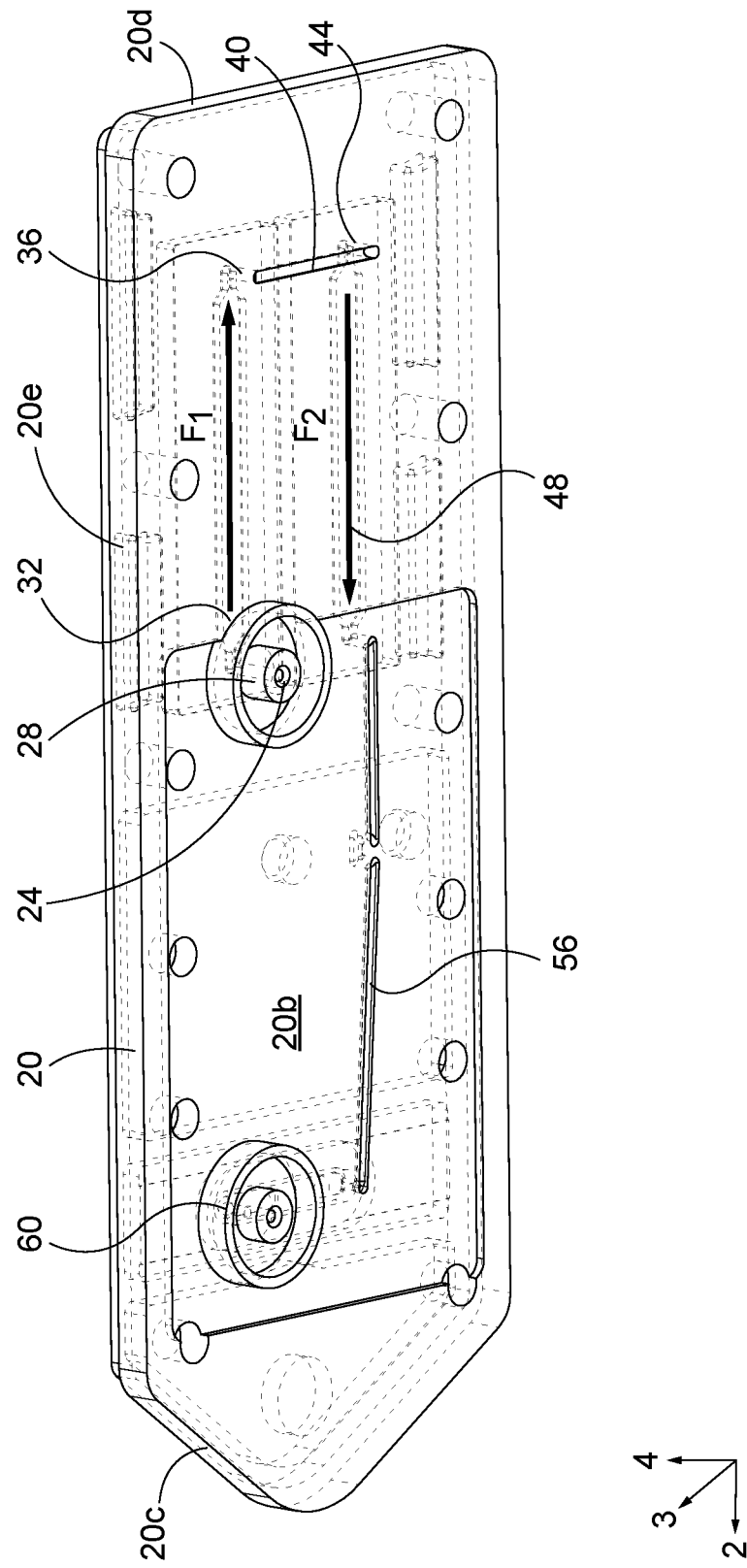
FIG. 3B is a bottom transparent perspective view of the base shown in FIG. 3A.

Referring to FIGS. 1 and 3A-3B, the base 20 is configured to hold the sensor substrates in an offset configuration with respect to each other. As is known in to one of skill in the art, the base 20 is configured to be incorporated into a sample analysis system (not shown) for testing, analyzing, and displaying various aspects of the sample fluid. As shown, the base 20 has an upper surface 20a, a lower surface 20b opposite the upper surface 20a along the vertical direction 4, a front end 20c, a rear end 20d opposite the front end 20c along the longitudinal direction 2, a first side 20e, and a second side 20f opposite the first side 20e along the lateral direction 3. In the illustrated embodiment, the base 20 defines a substantially rectangular prism shaped body with the front end 20c having a forward-facing apex. However, the base 20 can define other shapes as desired. For instance, the base 20 can be square, rectangular, oval, or have any other shape that facilitates placement and use with a sample analysis systems.

The base 20 may include a plurality of recesses for holding the sensor substrates 70 and 80. In accordance with the illustrated embodiment, the base 20 includes a first recess 22a that extends from the upper surface 20a into the base 20 and terminates at a first inner surface 23a before the lower surface 20b. The first recess 22a is configured to at least partially receive the first sensor substrate 70. The base 20 also includes a second recess 22b that extends from the upper surface 20a into the base 20 and terminates at a second inner surface 23b before the lower surface 20b. The second recess 22b may at least partially (or completely) receive the second sensor substrate 80. In the depicted embodiment, the first and second recesses 22a, 22b are spaced apart along the lateral direction 3. The first and second recesses 22a, 22b may also be substantially aligned along the lateral direction 3. However, in other embodiments, either of the first and second recesses 22a, 22b can be positioned elsewhere along the upper surface 20a of the base 20. Each of the first and second recesses 22a, 22b are depicted as substantially rectangular in shape, though this may differ according to the shape of the particular sensor substrate that will be disposed within the first and second recesses 22a, 22b. Each of the first and second recesses 22a, 22b can be sized such that an upper surface of the first and second sensor substrates 70, 80, respectively, are aligned with the upper surface 20a of the base 20 when the first and second sensor substrates 70, 80 are fully disposed within the first and second recesses 22a, 22b, respectively. Alternatively, the first and second recesses 22a, 22b can be sized such that the first and second sensor substrates 70, 80 slightly protrude from or are slightly recessed within the base 20 when fully disposed within the first and second recesses 22a, 22b, respectively.

Figure 2:
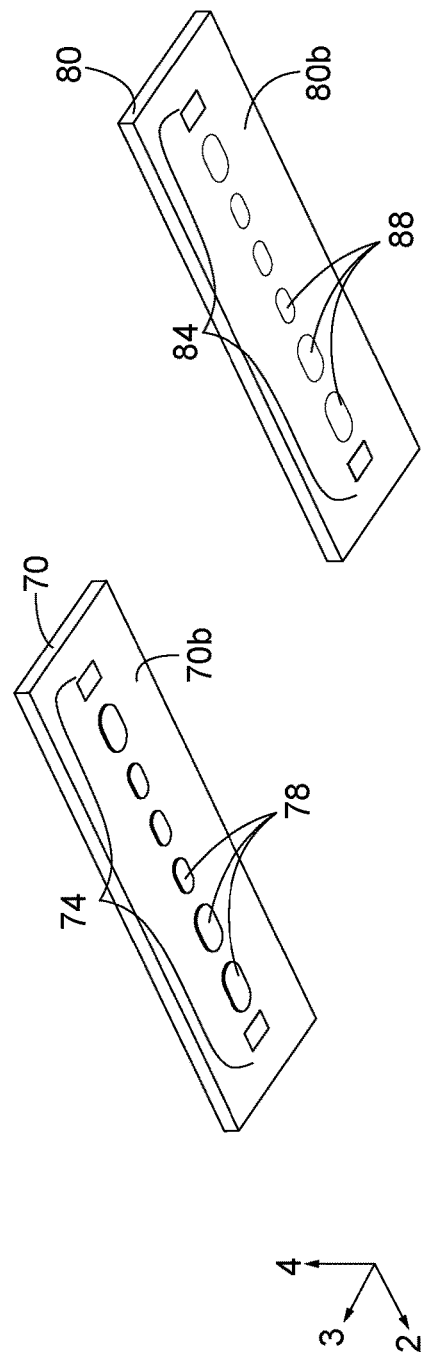
FIG. 2 is a perspective view of a first sensor substrate and a second sensor of the sensor assembly shown in FIG. 1.

Referring to FIG. 2, the first and second sensor substrates 70, 80 each hold a plurality of sensors for testing a particular attribute of a fluid. The first sensor substrate 70 defines an upper surface 70a and a lower surface 70b opposite the upper surface 70a along the vertical direction 4. In the illustrated embodiment, the first sensor substrate 70 is depicted as a rectangular prism, though other shapes are contemplated. Though each of the upper and lower surfaces 70a, 70b is depicted as being substantially planar, both of the upper and lower surfaces 70a, 70b can be alternatively shaped as desired. The first sensor substrate 70 can be configured as a first set of sensors 74 disposed on its lower surface 70b. The first set of sensors 74 may include eight sensors 78, each of which can be aligned on the first sensor substrate 70 along the longitudinal direction 2. However, the first set of sensors 74 can include more or less than eight sensors 78. The arrangement of the second set of sensors 74 will generally align with the shape of the first fluid passage 32, which will be described further below. However, it is contemplated that the first set of sensors 74 can be arranged differently from what is shown in the figures. Any of the sensors 78 can be a potentiometric sensor for measuring a property of the sample fluid. Alternatively, the sensors 78 can be other types of sensors, such as amperometric, conductometric, thermometric, optical, and piezoelectric sensors.

The second sensor substrate 80 defines an upper surface 80a and a lower surface 80b opposite the upper surface 80a along the vertical direction 4. As shown, the second sensor substrate 80 is depicted as defining a rectangular prism, though other shapes are contemplated. Though each of the upper and lower surfaces 80a, 80b is depicted as being substantially planar, both of the upper and lower surfaces 80a, 80b can be alternatively shaped as desired. The second sensor substrate 80 may include second set of sensors 84 disposed on its lower surface 80b. The second set of sensors 84 may include eight sensors 88, each of which can be aligned on the second sensor substrate 80 along the longitudinal direction 2. However, the second set of sensors 84 can include more or less than eight sensors 88. The arrangement of the second set of sensors 84 will generally align with the shape of the second fluid passage 48, which will be described further below. However, it is contemplated that the second set of sensors 84 can be arranged differently than what is explicitly shown. Any of the sensors 88 can be a potentiometric sensor. Alternatively, the sensors 88 can be other types of sensors. For instance, the sensors 88 can be amperometric, conductometric, thermometric, optical, and piezoelectric sensors. Although the first and second sets of sensors 74, 84 are depicted as being substantially the same, the first and second sets of sensors 74, 84 can define different types, arrangements, or numbers of sensors. For example, while one of the first and second sets of sensors 74, 84 can include potentiometric sensors, the other of the first and second sets of sensors 74, 84 can include sensors of a type other than potentiometric.

Each of the first and second sensor substrates 70, 80 are formed from materials designed to hold the sensors. In one example, the first and second substrates 70, 80 can be formed using a variety of processes and materials that are known to a person of ordinary skill in the art. For example, the first and second sensor substrates 70, 80 may be flexible or rigid and may be constructed using, for example, polymer, standard PCB, flex PCB, PET, PI, ceramic, glass, etc. After the first and second sensor substrates 70, 80 are formed, the first and second sets of sensors 74, 84 can be attached to the first and second sensor substrates 70, 80 through methods known in the art. After the first and second sensor substrates 70, 80 have been fully formed and the first and second sets of sensors 74, 84 have been attached, the first sensor substrate 70 can be attached to the base 20 in the first recess 22a with an adhesive. Likewise, the second sensor substrate 80 can be attached to the base 20 in the second recess 22b with an adhesive.

As shown in FIG. 1, the first and second sensor substrates 70, 80 can be positioned substantially parallel to each other when attached to the base 20. In this configuration, the first and second sensor substrates 70, 80 are spaced apart along the lateral direction 3, but aligned along the lateral direction 3, such that no portion of the first sensor substrate 70 overlies a portion of the second sensor substrate 80. Additionally, the first and second sensor substrates 70, 80 can be vertically aligned, though some vertical offset is contemplated.

Referring to FIGS. 1 and 3A-3B, the base 20 can define a plurality of passages for transporting the sample fluid through the sensor assembly 10. The base 20 and passages contained therein can be formed through injection molding, though other procedures are also contemplated. The base 20 can include an inlet 24 located on the lower surface 20b for receiving the sample fluid from another portion of the sample analysis system (not shown). As depicted, the inlet 24 can be located along the lower surface 20b at a position that overlies a portion of the first substrate 70 and the first recess 22a, such that the flow length of the sample fluid from the inlet 24 to the first substrate 70 is minimized. However, it should be understood that the inlet 24 could be located elsewhere along the lower surface 20b, or alternatively along the upper surface 20a. A first inlet passage 28 can extend substantially vertically from the inlet 24 to the first fluid passage 32, which is the portion of the fluid channel in which the first set of sensors 74 are exposed to the sample fluid. The first fluid passage 32 is substantially open to the first recess 22a and can extend substantially along the longitudinal direction 2. The first fluid passage 32 can also extend into the base 20 from the first recess 22a. For example, the first fluid passage 32 can extend from the first inner surface 23a towards the lower surface 20b and terminate before the lower surface 20b. The first fluid passage 32 can define a length along the longitudinal direction 2 that is less than a length of the first recess 22a along the longitudinal direction 2. Additionally or alternatively, the first fluid passage 32 can define a width along the lateral direction 3 that is less than a width of the first recess 22a along the lateral direction 3. In this configuration, when the sample fluid flows through the first fluid passage 32, the sample fluid flows along a first flow direction $F_1$ that is substantially parallel to the longitudinal direction 2. However, the first fluid passage 32 and the first flow direction $F_1$ are angularly offset from the longitudinal direction 2.

Continuing with FIGS. 1 and 3A-3B, the first fluid passage 32 is partially defined by the base 20 and partially defined by the first sensor substrate 70. As shown, the first set of sensors 74 are exposed to the first fluid passage 32 such that the sample fluid flowing through the first fluid passage 32 comes into contact with each of the sensors 78 of the first set of sensors 74. As the first set of sensors 74 are shown as aligned along the longitudinal direction 2, the first set of sensors 74 can be substantially aligned with both the first fluid passage 32 and the first flow direction $F_1$.

The sensor assembly 10 can define a set of passages that transport the sample fluid from the first fluid passage 32 to the second fluid passage 48 with these passages located downstream from the first fluid passage 32. In the depicted embodiment, this includes a first outlet passage 36 that extends from the first fluid passage 32 substantially along the vertical direction 4 to a first transfer passage 40. The first transfer passage 40, which can extend substantially along the lateral direction 3, extends from the first outlet passage 36 to a second inlet passage 44. The second inlet passage 48 extends substantially along the vertical direction 4 from the first transfer passage 44 to the second fluid passage 48. Though one particular arrangement of passages is described, it is contemplated that the passages between the first and second fluid passages 32, 48 can be differently configured.

Continuing with FIGS. 1 and 3A-3B, the second fluid passage 48 is located downstream from and in series with the first fluid passage 32. The second fluid passage 48 is substantially open to the second recess 22b. The second fluid passage 48 can extend substantially along the longitudinal direction 2. The second fluid passage 48 can also extend into the base 20 from the second recess 22b. For example, the second fluid passage 48 can extend from the second inner surface 23b towards the lower surface 20b and terminate before the lower surface 20b. The second fluid passage 48 can define a length along the longitudinal direction 2 that is less than a length of the second recess 22b along the longitudinal direction 2. Additionally or alternatively, the second fluid passage 48 can have a width along the lateral direction 3 that is less than a width of the second recess 22b along the lateral direction 3. In this configuration, when the sample fluid flows through the second fluid passage 48, the sample fluid flows along a second flow direction $F_2$ that is substantially parallel to the longitudinal direction 2 and opposite the first flow direction $F_1$. However, it is contemplated that the second fluid passage 48 can be differently designed, such that the second fluid passage 48 and the second flow direction $F_2$ are angularly offset from the longitudinal direction 2, and thus the second flow direction $F_2$ is not opposite the first flow direction $F_1$.

As shown, the second fluid passage 48 is partially defined by the base 20 and partially defined by the second sensor substrate 80. As a result, the first set of sensors 84 are exposed to the second fluid passage 48 such that the sample fluid flowing through the second fluid passage 48 comes into contact with each of the sensors 88 of the second set of sensors 84. As the second set of sensors 84 are shown as aligned along the longitudinal direction 2, the second set of sensors 84 can be substantially aligned with both the second fluid passage 48 and the second flow direction $F_2$.

The base 20 can include a second transfer passage 56 that extends from the second fluid passage 48 to the outlet 60. The outlet 60 is configured to emit the sample fluid back to the sample analysis system for disposal. As shown, the outlet 60 is defined in the lower surface 20b of the base 20 and can be positioned near the front end 20c. The outlet 60 is positioned so that it does not overlie either of the first or second sensor substrates 70, 80. However, like the inlet 24, it should be understood that the outlet 60 could be located elsewhere along the lower surface 20b, or alternatively along the upper surface 20a.

In addition, the base 20 can further include a plurality of bores 64 that extend through the base 20 from the upper surface 20a to the lower surface 20b. Each bore 64 can be configured to receive fasteners, such as a screw or a bolt, to releasably or permanently couple the sensor assembly 10 to the sample analysis system. Though the base 20 is depicted as including twelve bores 64, the base 20 can alternatively include any number or arrangement of bores 64 as desired.

Continuing with FIGS. 4A-6B, another embodiment of a sensor assembly 10a is shown. The sensor assembly 10a includes a first sensor substrate 170, a second sensor substrate 180, and a base 120 configured to receive the first and second sensor substrates 170, 180. The base 120 defines a plurality of fluidic passageways for receiving the sample fluid, as will be discussed further below.

Referring to FIGS. 4A-4B and 6A-6B, the base 120 is configured to hold the sensor substrates 170, 180. The base 120 has a similar purpose of functions as the base 20 described above. As shown, the base 120 has an upper surface 120a, a lower surface 120b opposite the upper surface 120a along the vertical direction 4, a front end 120c, a rear end 120d opposite the front end 120c along the longitudinal direction 2, a first side 120e, and a second side 120f opposite the first side 120e along the lateral direction 3. In the illustrated embodiment, the base 120 defines a substantially rectangular prism shaped body with a front end 120c having a forward-facing apex. However, it is contemplated that the base 120 can define other shapes as desired.

The base 120 includes a first recess 122a that extends from the upper surface 120a into the base 120 and terminates at a first inner surface 123a before the lower surface 120b. The first recess 122a is configured to at least partially receive the first sensor substrate 170. The base 120 also includes a second recess 122b that extends from the lower surface 120b into the base 120 and terminates at a second inner surface 123b before the upper surface 120a. The second recess 122a is configured to at least partially receive the second sensor substrate 180. In the depicted embodiment, the first and second recesses 122a, 122b at least partially overlie each other. Accordingly, the first and second recesses 122a, 122b contain portions that overlap along the longitudinal and/or lateral directions 2, 3. Each of the first and recesses 122a, 122b are depicted as substantially rectangular in shape. However, the shape of the recesses may differ according to the shape of the particular sensor substrate. The first recess 122a can be sized such that a lower surface 170b of the first sensor substrate 170 is aligned with the lower surface 120b of the base when the first sensor substrate 170 is fully disposed within the first recess 122a. The second recess 122b can be sized such that an upper surface 180a of the second sensor substrate 180 is aligned with the upper surface 120a of the base when the second sensor substrate 180 are fully disposed within the second recess 122b. Alternatively, the first and second recesses 122a, 122b can be sized such that the first and second substrates 170, 180 slightly protrude from or are slightly recessed within the base 120 when fully disposed within the first and second recesses 122a, 122b, respectively.

Figure 5:
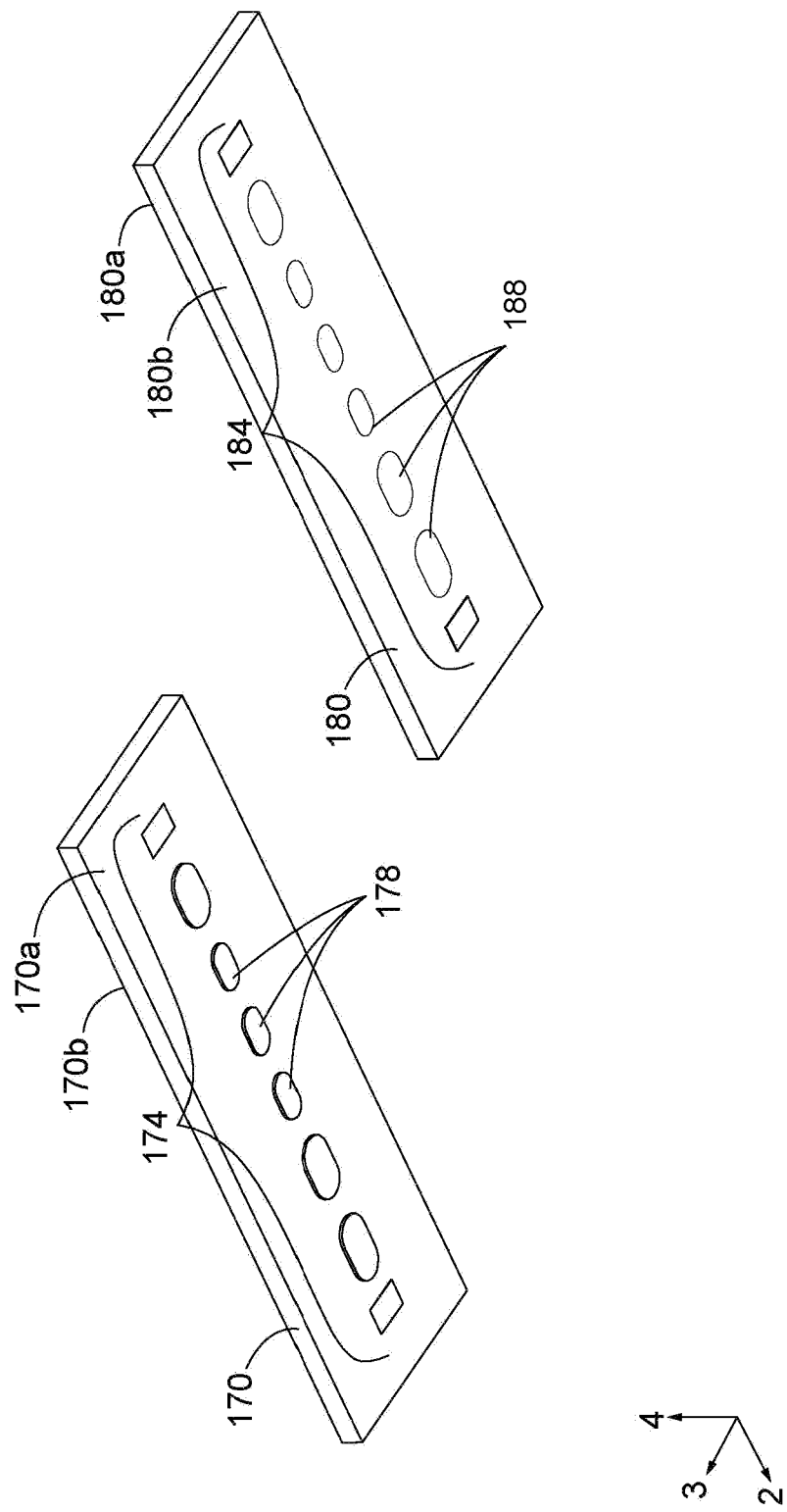
FIG. 5 is a perspective view of the first sensor substrate and the second sensor substrates of the sensor assembly shown in FIG. 4A.
Figure 6A:
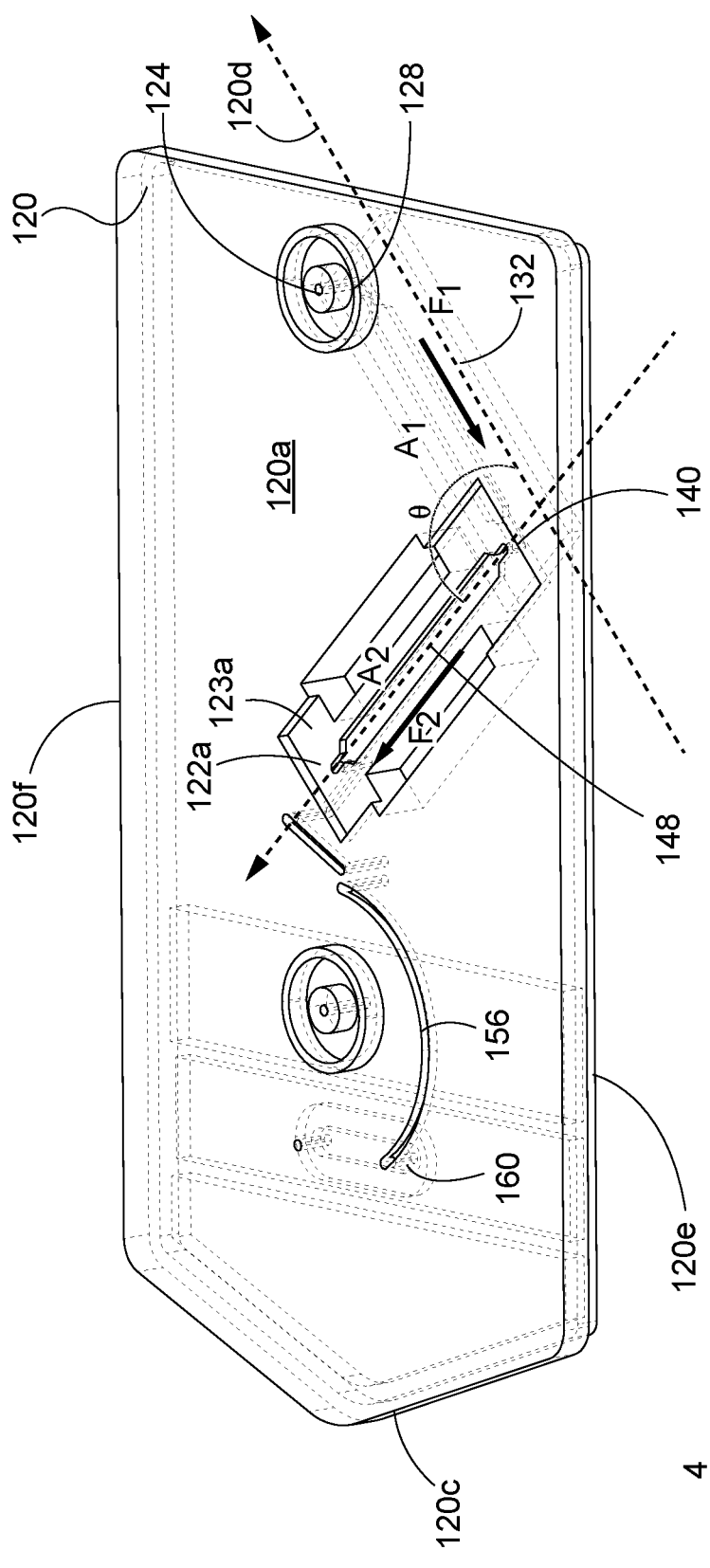
FIG. 6A is a top transparent perspective view of a base of the sensor assembly shown in FIG. 4A.
Figure 6B:
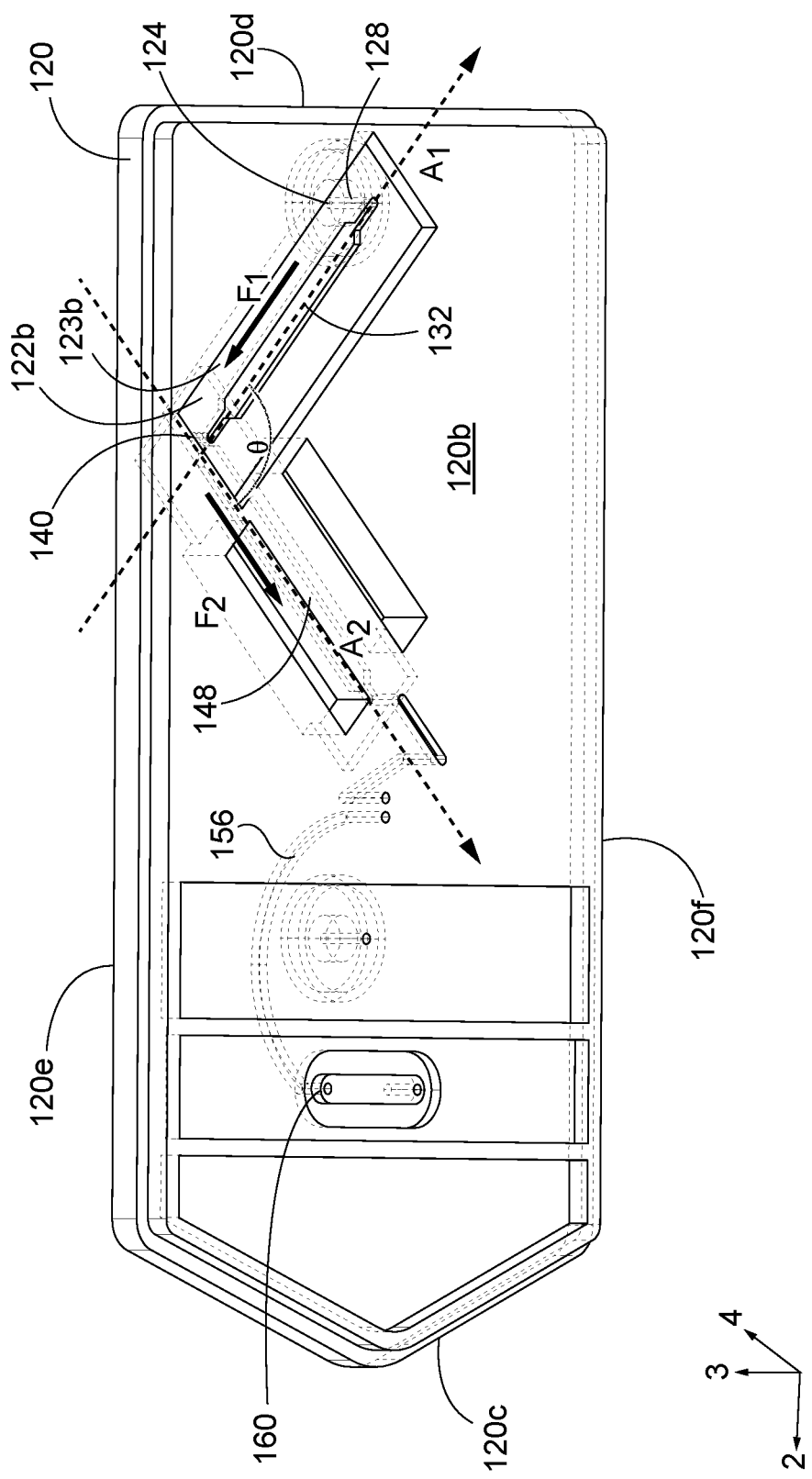
FIG. 6B is a bottom transparent perspective view of the sensor assembly shown in FIG. 6A.

Referring to FIG. 5, the first sensor substrate 170 defines an upper surface 170a and a lower surface 170b opposite the upper surface 170a along the vertical direction 4. As a result, the first sensor substrate 170 is depicted as defining a rectangular prism, though other shapes are contemplated. Though each of the upper and lower surfaces 170a, 170b is depicted as being substantially planar, both of the upper and lower surface 170a, 170b can be alternatively shaped as desired. The first sensor substrate 170 can be configured to have a first set of sensors 174 disposed on its upper surface 170a. The first set of sensors 174 is depicted as including eight sensors 178, each of which can be aligned on the first sensor substrate 170 along the longitudinal direction 2.

However, the first set of sensors 174 can include more or less than eight sensors 178. Though it is contemplated that the first set of sensors 174 can be arranged differently, the arrangement of the first set of sensors 174 will generally align with the shape of the first fluid passage 132, which will be described further below. Any of the sensors 178 can be a potentiometric sensor. Alternatively, the sensors 178 can be amperometric, conductometric, thermometric, optical, or piezoelectric sensors.

The second sensor substrate 180 holds the second set of sensors 184. As shown, the second sensor substrate 180 defines an upper surface 180a and a lower surface 180b opposite the upper surface 180a along the vertical direction 4. The second sensor substrate 180 can be configured to have a second set of sensors 184 disposed on its lower surface 180b. Due to this arrangement, when the sensor assembly 10a is fully assembled, the first and second sets of sensors 174, 184 will face in opposite directions. For instance, the first set of sensors 174 face downwardly toward the lower surface 120b of the base 120 and the second set of sensors 184 face toward the upper surface 120a of the base 120. The second set of sensors 184 is depicted as including eight sensors 188, each of which can be aligned on the second sensor substrate 180 along the longitudinal direction 2. However, the second set of sensors 184 can include more or less than eight sensors 188. Though it is contemplated that the second set of sensors 184 can be arranged differently, the arrangement of the second set of sensors 184 will generally align with the shape of the second fluid passage 148, which will be described further below. Like the sensors 178, any of the sensors 188 can be a potentiometric sensor. Alternatively, the sensors 188 can be amperometric, conductometric, thermometric, optical, or piezoelectric sensors. Though depicted as being substantially identical, the first and second sets of sensors 174, 184 can define different types, arrangements, or numbers of sensors. For example, while one of the first and second sets of sensors 174, 184 can include potentiometric sensors, the other of the first and second sets of sensors 174, 184 can include sensors of a type other than potentiometric.

Each of the first and second sensor substrates 170, 180 may be fixed to the base 120. After the first substrate 170 is fully formed and the first sets of sensors 174, the first sensor substrate 170 can be attached to the base 120 within the first recess 122a with an adhesive. Furthermore, the second sensor substrate 180 can be attached to the base 120 within the second recess 122b with an adhesive as well. As shown in FIGS. 4A-4B, the first and second sensor substrates 170, 180 can be positioned angularly offset to each other when attached to the base 120. In this configuration, the first sensor substrate 170 is positioned along a first axis $A_1$, while the second sensor substrate 180 is positioned along a second axis $A_2$ that is angularly offset form the first axis $A_1$ by an angle θ. The orientation of the first and second axes $A_1$, $A_2$, will be described further below. In this configuration, the first and second sensor substrates 170, 180 at least partially overlie each other along the vertical direction 4, such that at least a portion of the first sensor substrate 170 is aligned with at least a portion of the second sensor substrate 180 along the vertical direction. Further, at least a portion of the first sensor substrate 170 can be out of alignment with at least a portion of the second sensor substrate 180 along the vertical direction.

Now referring to FIGS. 4A-4B and 6A-6B, the base 120 can define a plurality of passages for transporting the sample fluid through the sensor assembly 10a. The base 120 and passages contained therein can be formed through injection molding, though other procedures are also contemplated. The base 120 can include an inlet 124 located on the upper surface 120a for receiving the sample fluid from another portion of the sample analysis system (not shown). As depicted, the inlet can be located along the upper surface 120a at a position that overlies a portion of the first substrate 170 and the first recess 122a such that the flow length of the sample fluid from the inlet 124 to the first substrate 170 is minimized. However, it should be understood that the inlet 124 could be located elsewhere along the upper surface 120a, or alternatively along the lower surface 120b. A first inlet passage 128 can extend substantially vertically from the inlet 124 to the first fluid passage 132, which is the portion of the fluid channel in which the first set of sensors 174 are exposed to the sample fluid. The first fluid passage 132 is substantially open to the first recess 122a. For example, the first fluid passage 132 can extend from the first inner surface 123a towards the lower surface 120b and terminate before the lower surface 120b. The first fluid passage 132 can define a length that is less than a length of the first recess 122a along the same direction. Additionally or alternatively, the first fluid passage 132 can define a width that is less than a width of the first recess 122a along the same direction. The first fluid passage 132 can extend substantially along the first axis $A_1$, such that when the sample fluid flows through the first fluid passage 132, the sample fluid flows along a first flow direction $F_1$ that is collinear with the first axis $A_1$.

The first fluid passage 132 may be partially defined by the base 120 and partially defined by the first sensor substrate 170. As a result, the first set of sensors 174 are exposed to the first fluid passage 132 such that the sample fluid flowing through the first fluid passage 132 comes into contact with each of the first sensors 178 of the first set of sensors 174 so that the sensors 178 can detect any desired feature of the sample fluid. As the first set of sensors 174 is shown as aligned along the longitudinal direction 2, the first set of sensors 174 can be substantially aligned with the first fluid passage 132, the first flow direction $F_1$, and the first axis $A_1$.

Downstream from the first fluid passage 132, the sensor assembly 10a may include a single passage that transports the sample fluid from the first fluid passage 132 to the second fluid passage 148. In the depicted embodiment, this includes a first transfer passage 140 that extends substantially along the vertical direction 4 from the first fluid passage 132 to the second fluid passage 148. Though one particular passage is shown, it is contemplated that the passages between the first and second fluid passages 132, 148 can be differently configured.

Continuing with FIGS. 4A-4B and 6A-6B, the second fluid passage 148 is located downstream from and in series with the first fluid passage 132. The second fluid passage 148 is substantially open to the second recess 122b. For example, the second fluid passage 148 can extend from the second inner surface 123b towards the upper surface 120a and terminate before the upper surface 120a. The second fluid passage 148 can define a length that is less than a length of the second recess 122b along the same direction. Additionally or alternatively, the second fluid passage 148 can define a width that is less than a width of the second recess 122b along the same direction. The second fluid passage 148 can extend along a second axis $A_2$, such that sample fluid flowing through the second fluid passage 148 flows along a second flow direction $F_2$ that is collinear with the second axis $A_2$. The second axis $A_2$ is angularly offset from the first axis $A_1$ by an angle $\theta$. Similarly, the first flow direction $F_1$ is angularly offset form the second flow direction by the angle $\theta$. In the depicted embodiment, the angle $\theta$ is about 90 degrees. However, it is contemplated that the first and second fluid passages 132, 148 can be alternatively oriented such that the angle $\theta$ differs. For example, the angle $\theta$ can be from about zero degrees to about 180 degrees. In one embodiment, the angle $\theta$ is zero degrees. In another embodiment, the angle $\theta$ is 180 degrees. As a result, the first and second fluid directions $F_1$, $F_2$ can extend in substantially the same direction. Alternatively, the first and second fluid directions $F_1$, $F_2$ can be opposite each other.

When the sensor assembly 10a is fully assembled, the second fluid passage 148 is partially defined by the base 120 and partially defined by the second sensor substrate 180. As a result, the second set of sensors 184 are exposed to the second fluid passage 148, such that the sample fluid flowing through the second fluid passage 148 comes into contact with each of the sensors 188 of the second set of sensors so that the sensors 188 can detect any desired feature of the sample fluid. As the second set of sensors 184 is shown as aligned along the longitudinal direction 2, the second set of sensors 184 can be substantially aligned with the second fluid passage 148, the second flow direction $F_2$, and the second axis $A_2$.

Downstream from the second fluid passage 148, the base 120 can include a series of passages that extends from the second fluid passage 148 to the outlet 160. The outlet 160 is configured to emit the sample fluid back to the sample analysis system for disposal. The base 120 can include a vertically-extending outlet passage 120 that extends from the second fluid passage 148 to a second transfer passage 156. The second transfer passage 156 can extend from the second fluid passage 148 to the outlet 160 along a curved path. However, though the outlet passage 120 and second transfer passage 156 are shown as directing the sample fluid from the second fluid passage 148 to the outlet 160, more or less passages, or a different arrangement of the passages, are contemplated. The outlet 160 is defined in the lower surface 120b of the base 120 and can be positioned near the front end 120c. The outlet 160 can be positioned so that it does not overlie either of the first or second sensor substrates 170, 180. However, it should be understood that the outlet 160 could be located elsewhere along the lower surface 120b or alternatively along the upper surface 120a.

Figure 7A:
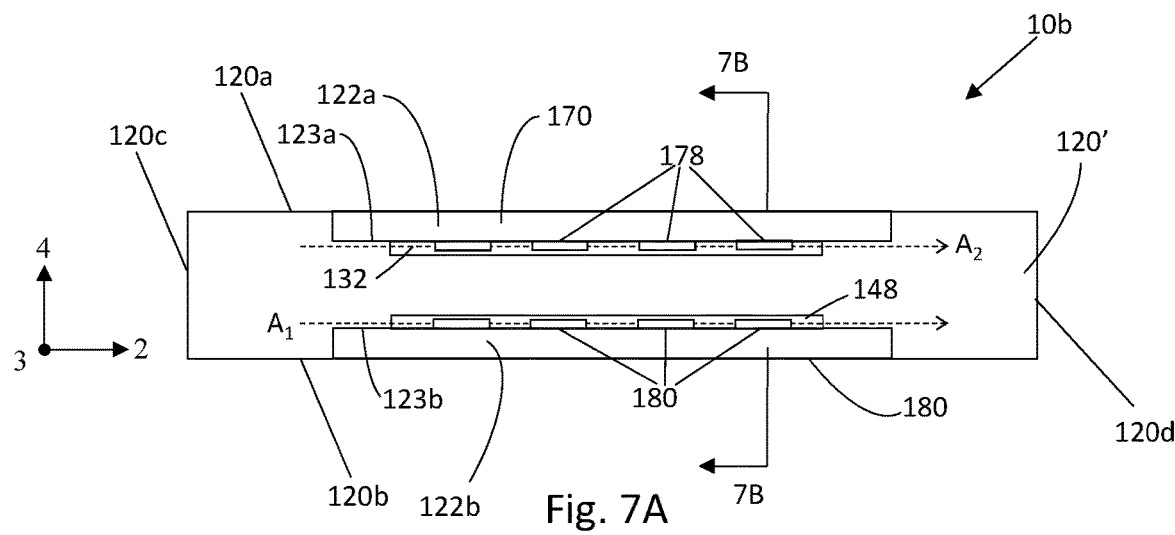
FIG. 7A is a side schematic sectional view of a sensor assembly according to another embodiment of the present disclosure.
Figure 7B:
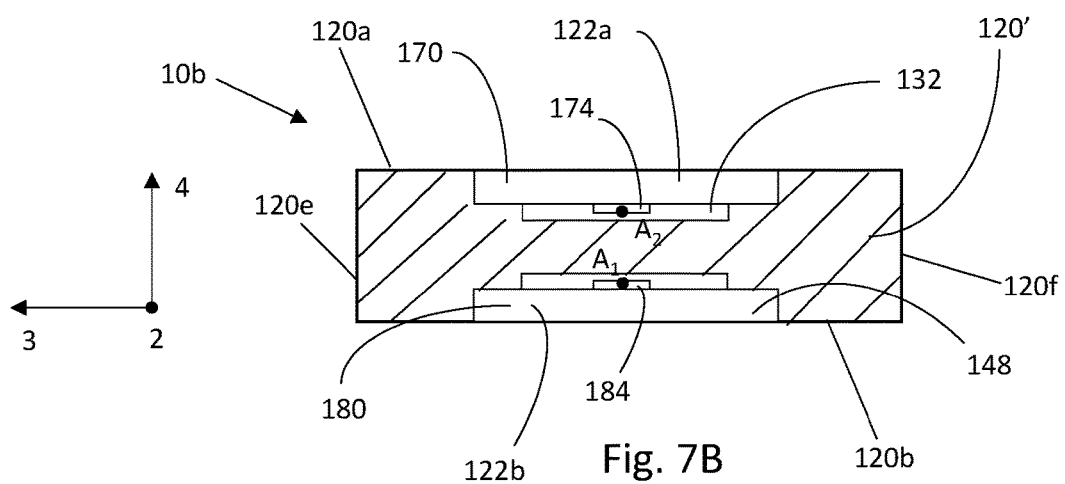
FIG. 7B is a cross-sectional view of the sensor assembly shown in FIG. 7A, taken along line 7B-7B in FIG. 7A.

Referring to FIGS. 7A-7B, a sensor assembly 10b includes features similar to sensor assembly 10a and for that reason the same reference numbers will be used. In sensor assembly 10b, a base 120' is configured to be incorporated into a sample analysis system (not shown) for testing, analyzing, and displaying various aspects of the sample fluid. The base 120' has an upper surface 120a, a lower surface 120b opposite the upper surface 120a along the vertical direction 4, a front end 120c, a rear end 120d opposite the front end 120c along the longitudinal direction 2, a first side 120e, and a second side 120f opposite the first side 120e along the lateral direction 3. In the illustrated embodiment, the base 120' defines a substantially rectangular prism. However, the base 120' can define other shapes as desired. For instance, the base 20 can be square, rectangular, oval, or have any other shape that facilitates placement and use with a sample analysis systems.

The base 120' can include a plurality of recesses for holding the sensor substrates 170 and 180. In accordance with the illustrated embodiment, the base 120' includes a first recess 122a that extends from the upper surface 120a into the base 120' and is configured to at least partially receive the first sensor substrate 170. The base 120' also includes a second recess 122b that extends from the lower surface 120b into the base 120' and is configured to at least partially receive the second sensor substrate 180. As a result, the first and second sensor substrates 170, 180 are positioned along opposite sides of the base 120'. The first and second recesses 122a, 122b can be substantially aligned along the vertical direction 4, such that the first and second sensor substrates 170, 180 can overlie each other.

As shown in FIG. 7A, the first and second recesses 122a, 122b, and likewise the first and second sensor substrates 170, 180, can be identically positioned longitudinally along the base 120'. That is, the first and second recesses 122a, 122b can be equally spaced from the front end 120c and the rear end 120d. Similarly, as shown in FIG. 7B, the first and second recesses 122a, 122b, and likewise the first and second sensor substrates 170, 180, can be identically positioned laterally along the base 120'. That is, the first and second recesses 122a, 122b can be equally spaced from first side 120e and the second side 120f.

The base 120' can further include first and second fluid passages 132, 148 for receiving the sample fluid, where the first fluid passage 132 is open to the first recess 122a and the second fluid passage 148 is open to the second recess 122b. The first fluid passage 132 defines the area of the base 120' where each sensor 178 of the set of sensors 174 is exposed to the sample fluid, and the second fluid passage 148 defines the area of the base 120' where each sensor 180 of the second set of sensors 184 is exposed to the sample fluid. Like the recesses 122a, 122b and the substrates 170, 180, the first and second fluid passages 132, 148 can overlie each other, such that the first and second fluid passages 132, 148 are aligned along the vertical direction 4. The first fluid passage 132 can extend into the base 120' from the first recess 122a. For example, the first fluid passage 132 can extend from the first inner surface 123a towards the lower surface 120b and terminate before the lower surface 120b. Further, the first fluid passage 132 can define a length along the longitudinal direction 2 that is less than a length of the first recess 122a along the longitudinal direction 2. Additionally or alternatively, the first fluid passage 132 can define a width along the lateral direction 3 that is less than a width of the first recess 122a along the lateral direction 3. The second fluid passage 148 can extend into the base 120' from the second recess 122b. For example, the second fluid passage 148 can extend from the second inner surface 123b towards the upper surface 120a and terminate before the upper surface 120a. The second fluid passage 148 can define a length along the longitudinal direction 2 that is less than a length of the second recess 122b along the longitudinal direction 2. Additionally or alternatively, the second fluid passage 148 can define a width along the lateral direction 3 that is less than a width of the second recess 122b along the lateral direction 3. The first fluid passage 132 can extend along a first axis $A_1$ and the second fluid passage 148 can extend along a second axis $A_2$, where the first and second axes $A_1$, $A_2$ are substantially parallel to each other. In one embodiment, the first and second axes $A_1$, $A_2$ can each extend along the longitudinal direction 2. The direction of fluid flow within the first and second fluid passages 132, 148 of the sensor assembly 10b can be substantially opposite each other.

Referring to FIGS. 8A and 8B, a sensor assembly 10c will be described. Where the sensor assembly 10c includes like features to sensor assembly 10a, the same reference numbers will be used. In sensor assembly 10c, the first and second sensor substrates 170, 180 are positioned along opposite sides of a base 120". The first and second sensor substrates 170, 180 can be positioned such that they do not overlie each other, but are positioned in series along the longitudinal direction 2 and substantially aligned along the longitudinal direction 2. Similarly, the first and second fluid passages 132, 148 may not overlie each other, but are positioned in series along the longitudinal direction 2 and substantially aligned along the longitudinal direction 2. The direction of fluid flow within the first and second fluid passages 132, 148 of the sensor assembly 10c can be substantially the same.

Sensor assemblies 10, 10a, 10b, and 10c provide advantages in analyzing fluid samples, particularly those from neonates, due to the low volume of the fluidic path that extends through the sensor assemblies 10, 10a, 10b, and 10c. Due to the serial nature of the sensor assemblies and the placement of the sensor substrates, the volume of sample fluid required to detect multiple analytes is minimized in order to conserve the supply of sample fluid and/or decrease costs. The simple configuration of sensor assemblies 10, 10a, 10b, and 10c discussed above provides the added benefit of maximizing the number of sensors that can be incorporated into a single sensor assembly and decreases the complexity required for sensor assembly.

The invention includes the following illustrative embodiments:

Embodiment 1 is a sensor assembly. The sensor assembly includes a first sensor substrate having an upper surface, a lower surface opposite the upper surface, and a first set of sensors disposed along the lower surface of the first sensor substrate. The sensor assembly includes a second sensor substrate having an upper surface, a lower surface opposite the upper surface, and a second set of sensors disposed along the lower surface of the second sensor substrate. The sensor assembly includes a base. The base has an upper surface, a lower surface opposite the upper surface of the base along a vertical direction, and a front end. The base has a rear end opposite the front end along a longitudinal direction that is perpendicular to the vertical direction, a first recess that extends from the upper surface of the base and at least partially holds the first sensor substrate, and a second recess that extends from the upper surface of the base and at least partially holds the second sensor substrate. The base has a first fluid passage for receiving a fluid and a second fluid passage in series with and open to the first fluid passage. The first set of sensors is exposed to the first fluid passage, and the second set of sensors is exposed to the second fluid passage.

Embodiment 2 is the sensor assembly according to embodiment 1, wherein the first and second fluid passages extend along the longitudinal direction, such that the fluid flows through the first fluid passage in a first flow direction through the second fluid passage in a second flow direction that is opposite the first flow direction.

Embodiment 3 is the sensor assembly according to embodiment 1, wherein the first and second sensor substrates are spaced apart along a lateral direction that is perpendicular to the longitudinal direction.

Embodiment 4 is the sensor assembly according to embodiment 3, wherein the first recess and the second recess are each substantially aligned along the lateral direction.

Embodiment 5 is the sensor assembly of according to embodiment 3, further comprising a transfer passage that extends from the first fluid passage to the second fluid passage substantially along the lateral direction.

Embodiment 6 is the sensor assembly according to embodiment 1, wherein the first and second sensor substrates are positioned substantially parallel to each other.

Embodiment 7 is the sensor assembly according to embodiment 1, wherein the first fluid passage is partially defined by each of the body of the base and the first sensor substrate, and the second fluid passage is partially defined by each of the body of the base and the second sensor substrate.

Embodiment 8 is the sensor assembly according to embodiment 1, wherein lower surface of the base defines an inlet for receiving the fluid and an outlet for emitting the fluid.

Embodiment 9 is the sensor assembly according to embodiment 1, wherein one of the first and second sets of sensors comprises potentiometric sensors, and the other of the first and second sets of sensors comprises other types sensors.

Embodiment 10 is a sensor assembly. The sensor assembly includes a first sensor substrate having an upper surface, a lower surface opposite the upper surface, and a first set of sensors disposed on the lower surface of the first sensor substrate. The sensor assembly includes a second sensor substrate defining an upper surface, a lower surface opposite the upper surface, and a second set of sensors disposed on the upper surface of the second sensor substrate. The sensor assembly includes a base. The base has an upper surface, a lower surface opposite the upper surface of the base along a vertical direction, and a front end. The base has a rear end opposite the front end along a longitudinal direction that is perpendicular to the vertical direction, a first recess that extends from the upper surface of the base and at least partially holds the first sensor substrate, and a second recess that extends from the lower surface of the base and at least partially holds the second sensor substrate. The base has a first fluid passage for receiving a fluid, and a second fluid passage in series with and open to the first fluid passage. The first set of sensors is exposed to the first fluid passage, and the second set of sensors is exposed to the second fluid passage.

Embodiment 11 is the sensor assembly according to embodiment 10, wherein the first sensor passage extends along a first axis and the second sensor passage extends along a second axis that is offset from the first axis by an angle.

Embodiment 12 is the sensor assembly according to embodiment 11, wherein the angle is about 90 degrees.

Embodiment 13 is the sensor assembly according to embodiment 11, wherein the angle is about 180 degrees.

Embodiment 14 is the sensor assembly according to embodiment 10, wherein the fluid flows through the first fluid passage in a first flow direction and the fluid flows through the second fluid passage in a second flow direction that is opposite the first flow direction.

Embodiment 15 is the sensor assembly according to embodiment 10, the first sensor substrate overlies the second sensor substrate along the vertical direction.

Embodiment 16 is the sensor assembly according to embodiment 15, wherein the first and second sensor substrates are substantially aligned along the vertical direction.

Embodiment 17 is the sensor assembly according to embodiment 10, further comprising a transfer passage that extends from the first fluid passage to the second fluid passage, wherein the transfer passage extends substantially along the vertical direction.

Embodiment 18 is the sensor assembly according to embodiment 10, wherein the first fluid passage is partially defined by each of the base and the first sensor substrate and the second fluid passage is partially defined by each of the base and the second sensor substrate.

Embodiment 19 is the sensor assembly according to embodiment 10, wherein the upper surface of the base defines an inlet for receiving the fluid, and the lower surface of the base defines an outlet for emitting the fluid.

Embodiment 20 is the sensor assembly according to embodiment 10, wherein one of the first and second sets of sensors comprises potentiometric sensors, and the other of the first and second sets of sensors comprises other types of sensors.

Those skilled in the art will also appreciate that the present disclosure may be applied to other applications and may be modified without departing from the scope of the present disclosure. Accordingly, the scope of the present disclosure is not intended to be limited to the exemplary embodiments described above, but only by the appended claims.

What is claimed:
1. A sensor assembly comprising:
a first sensor substrate having an upper surface, a lower surface opposite the upper surface, and a first set of sensors disposed along the lower surface of the first sensor substrate;
a second sensor substrate having an upper surface, a lower surface opposite the upper surface, and a second set of sensors disposed along the lower surface of the second sensor substrate; and
a base having an upper surface, a lower surface opposite the upper surface of the base along a vertical direction, a front end, a rear end opposite the front end along a longitudinal direction that is perpendicular to the vertical direction, a first recess that extends from the upper surface of the base and at least partially holds the first sensor substrate, a second recess that extends from the upper surface of the base and at least partially holds the second sensor substrate, a first fluid passage for receiving a fluid, and a second fluid passage in series with and open to the first fluid passage,
wherein the first set of sensors is exposed to the first fluid passage, and the second set of sensors is exposed to the second fluid passage.

2. The sensor assembly of claim 1, wherein the first and second fluid passages extend along the longitudinal direction, such that the fluid flows through the first fluid passage in a first flow direction and through the second fluid passage in a second flow direction that is opposite the first flow direction.

3. The sensor assembly of claim 1, wherein the first and second sensor substrates are spaced apart along a lateral direction that is perpendicular to the longitudinal direction.

4. The sensor assembly of claim 3, wherein the first recess and the second recess are each substantially aligned along the lateral direction.

5. The sensor assembly of claim 3, further comprising a transfer passage that extends between the first fluid passage to the second fluid passage substantially along the lateral direction.

6. The sensor assembly of claim 1, wherein the first and second sensor substrates are positioned substantially parallel to each other.

7. The sensor assembly of claim 1, wherein the first fluid passage is partially defined by each of the base and the first sensor substrate, and the second fluid passage is partially defined by each of the base and the second sensor substrate.

8. The sensor assembly of claim 1, wherein lower surface of the base defines an inlet for receiving the fluid and an outlet for emitting the fluid.

9. The sensor assembly of claim 1, wherein each of the first and second sensor substrates are secured within the respective first and second recesses by an adhesive.

10. The sensor assembly of claim 1, wherein one of the first and second sets of sensors are potentiometric sensors, and the other of the first and second sets of sensors comprises other types sensors.

11. A sensor assembly comprising:
a first sensor substrate having an upper surface, a lower surface opposite the upper surface, and a first set of sensors disposed on the upper surface of the first sensor substrate;
a second sensor substrate defining an upper surface, a lower surface opposite the upper surface, and a second set of sensors disposed on the lower surface of the second sensor substrate;
a base having a body that defines an upper surface, a lower surface opposite the upper surface of the base along a vertical direction, a front end, a rear end opposite the front end along a longitudinal direction that is perpendicular to the vertical direction, a first recess that extends from the lower surface of the base and at least partially holds the first sensor substrate, a second recess that extends from the upper surface of the base and at least partially holds the second sensor substrate, a first fluid passage for receiving a fluid, and a second fluid passage in series with and open to the first fluid passage,
wherein the first set of sensors is exposed to the first fluid passage, and the second set of sensors is exposed to the second fluid passage.

12. The sensor assembly of claim 11, the first sensor substrate overlies the second sensor substrate along the vertical direction.

13. The sensor assembly of claim 11, wherein the first fluid passage extends along a first axis and the second fluid passage extends along a second axis that is offset from the first axis by an angle.

14. The sensor assembly of claim 13, wherein the angle is about 90 degrees.

15. The sensor assembly of claim 13, wherein the angle is about 180 degrees.

16. The sensor assembly of claim 11, wherein the fluid flows through the first fluid passage in a first flow direction and the fluid flows through the second fluid passage in a second flow direction that is opposite the first flow direction.

17. The sensor assembly of claim 16, wherein the first and second sensor substrates are substantially aligned along the vertical direction.

18. The sensor assembly of claim 11, further comprising a transfer passage that extends from the first fluid passage to the second fluid passage, wherein the transfer passage extends substantially along the vertical direction.

19. The sensor assembly of claim 11, wherein the first fluid passage is partially defined by each of the base and the first sensor substrate and the second fluid passage is partially defined by each of the base and the second sensor substrate.

20. The sensor assembly of claim 11, wherein the upper surface of the base defines an inlet for receiving the fluid, and the lower surface of the base defines an outlet for emitting the fluid.

* * * * *